(12) United States Patent
Chen et al.

(10) Patent No.: US 10,022,002 B2
(45) Date of Patent: Jul. 17, 2018

(54) EXTENSIBLE Z ACCESSORIZED TRAVEL HEAD REST

(71) Applicants: Robert C V Chen, Cupertino, CA (US); Tiffany Y W Chen, Cupertiono, CA (US)

(72) Inventors: Robert C V Chen, Cupertino, CA (US); Tiffany Y W Chen, Cupertiono, CA (US)

( * ) Notice: Subject to any disclaimer, the term of this patent is extended or adjusted under 35 U.S.C. 154(b) by 0 days.

(21) Appl. No.: 15/349,992

(22) Filed: Nov. 11, 2016

(65) Prior Publication Data

US 2018/0132636 A1    May 17, 2018

(51) Int. Cl.
*A47C 20/00*    (2006.01)
*A47G 9/10*    (2006.01)
*A47B 3/10*    (2006.01)
*A47B 37/00*    (2006.01)
*A47B 23/06*    (2006.01)
*A47G 9/00*    (2006.01)

(52) U.S. Cl.
CPC .............. *A47G 9/1045* (2013.01); *A47B 3/10* (2013.01); *A47B 23/06* (2013.01); *A47B 37/00* (2013.01); *A47G 9/1009* (2013.01); *A47G 9/1054* (2013.01); *A47B 2200/008* (2013.01); *A47B 2200/0085* (2013.01); *A47G 2009/005* (2013.01); *A47G 2009/006* (2013.01)

(58) Field of Classification Search
CPC ..... A47B 3/10; A47B 37/00; A47B 2200/008; A47B 2200/0085; A47B 23/06; A47G 9/1045; A47G 9/1009; A47G 9/1054; A47G 2009/005; A47G 2009/006
See application file for complete search history.

(56) References Cited

U.S. PATENT DOCUMENTS

| | | | | |
|---|---|---|---|---|
| 4,726,556 A | * | 2/1988 | Weir ...................... | A47B 27/18 248/454 |
| 6,234,085 B1 | * | 5/2001 | Ramundo ............ | A47B 23/002 108/143 |
| 6,264,156 B1 | * | 7/2001 | Yeh .................... | A47B 23/06 248/346.01 |
| 6,944,012 B2 | * | 9/2005 | Doczy .................. | G06F 1/1626 312/208.1 |
| D671,595 S | * | 11/2012 | O'Hara ...................... | D14/307 |
| 9,089,203 B1 | * | 7/2015 | Al-Raqadi ............... | A47B 1/04 |
| 9,150,130 B2 | * | 10/2015 | Jackow ................ | B60N 2/4805 |
| 9,380,847 B1 | * | 7/2016 | Killebrew ................ | A45C 9/00 |
| 9,606,365 B2 | * | 3/2017 | Muller .................. | G02B 27/021 |

(Continued)

*Primary Examiner* — David E Sosnowski
(74) *Attorney, Agent, or Firm* — Lyman Moulton, Esq.

(57) ABSTRACT

A travel aid device and system are disclosed comprising an upper platform adapted to receive a pillow thereon and a plurality of accessories therein. The disclosed device and system also include a lower platform base adapted to rest on a flat supporting surface and receive a plurality of accessories via a plurality of accessory ports therein. The disclosure also includes a pair of extension arms configured to connect the upper platform and the lower base in a "Z" shape via at least two points on each platform. The disclosure additionally includes use with a travel pillow shaped like a donut to receive a traveler's face therein, the travel pillow received onto a top surface of the upper platform. The upper and lower platforms are collapsible into a single laptop-like shell for compact transport and the pillow is detachable therefrom. A ratcheting hub and an angle lock knob or lock button are included.

10 Claims, 7 Drawing Sheets

(56) References Cited

U.S. PATENT DOCUMENTS

| | | | | |
|---|---|---|---|---|
| 9,625,081 B2* | 4/2017 | Olander | | F16M 11/10 |
| 2003/0172462 A1* | 9/2003 | Hoggatt | | A47C 20/023 |
| | | | | 5/657 |
| 2005/0056309 A1* | 3/2005 | Bree | | A47G 9/1045 |
| | | | | 135/147 |
| 2005/0099102 A1* | 5/2005 | Villarreal | | A47B 3/10 |
| | | | | 312/237 |
| 2007/0290817 A1* | 12/2007 | Huang | | G08B 6/00 |
| | | | | 340/309.16 |
| 2008/0041683 A1* | 2/2008 | Dorquez | | A45C 9/00 |
| | | | | 190/11 |
| 2009/0094750 A1* | 4/2009 | Oguma | | A61F 5/56 |
| | | | | 5/636 |
| 2011/0056412 A1* | 3/2011 | Grammer | | A45C 9/00 |
| | | | | 108/6 |
| 2013/0074742 A1* | 3/2013 | Hsieh | | A47B 23/06 |
| | | | | 108/49 |
| 2013/0098275 A1* | 4/2013 | Blekestad | | A47B 37/00 |
| | | | | 108/28 |
| 2013/0136288 A1* | 5/2013 | Wadud | | A47B 23/06 |
| | | | | 381/333 |
| 2013/0232696 A1* | 9/2013 | Halimi | | A47C 16/00 |
| | | | | 5/640 |
| 2014/0033439 A1* | 2/2014 | Berhanu | | A47C 16/00 |
| | | | | 5/640 |
| 2014/0124631 A1* | 5/2014 | Olander | | F16M 11/10 |
| | | | | 248/164 |
| 2014/0216873 A1* | 8/2014 | Torres Montes | | A45C 9/00 |
| | | | | 190/11 |
| 2015/0076974 A1* | 3/2015 | Schreiter | | A47B 17/036 |
| | | | | 312/140.4 |
| 2015/0098213 A1* | 4/2015 | Muller | | G02B 27/021 |
| | | | | 362/142 |
| 2017/0105519 A1* | 4/2017 | Wang | | A47B 23/04 |
| 2017/0273480 A1* | 9/2017 | Du | | A61G 13/121 |
| 2017/0273481 A1* | 9/2017 | Du | | A47G 9/1009 |

* cited by examiner

US 10,022,002 B2

EXTENSIBLE Z ACCESSORIZED TRAVEL HEAD REST

BACKGROUND OF THE INVENTION

Anyone who has ever taken a flight longer than 3 hours knows how difficult it is to sleep comfortably in the cramped conditions of economy class seating. Inflatable travel pillows allow some ergonomic comfort in a portable form factor. However, conventional travel pillows center around a traveler's neck and therefore do not offer variable heights and angles of support to large and small people.

Additionally, sitting next to a passenger of larger girth can make it hard for a neighboring passenger to relax on even one of the provided armrests. Some passengers simply take up both armrests and leave no place for a less aggressive or less weighty passenger to rest their arms without resorting to folding their arms across their chest or to taking other measures.

Even though various design improvements have been made to the travel pillow but its basic limitations still remain. Like any pillow, a travel pillow needs a bed yet sitting accommodations on an airplane, bus or a train simply do not offer anything other than a window wall or the head rest of a seat in front of or behind a passenger.

There has therefore been a long unsatisfied demand in the market place for a device, system and method of resting a traveler's head in a face first position that also provides electronic accessory accommodations.

SUMMARY OF THE INVENTION

A travel aid device and system are disclosed comprising an upper platform adapted to receive a pillow thereon and a plurality of accessories therein. The disclosed device and system also include a lower platform or base adapted to rest on a flat supporting surface and receive a plurality of accessories via a plurality of accessory ports therein. The disclosure also includes a pair of extension arms configured to connect the upper platform and the lower base in a "Z" shape via at least two points on each platform. The disclosure additionally includes use with a travel pillow shaped like a donut to receive a traveler's face therein, the travel pillow received onto a top surface of the upper platform.

A disclosed traveler resting method includes providing an upper platform adapted to receive a pillow thereon and a plurality of accessories therein, and providing a lower base adapted to rest on a flat supporting surface and receive a plurality of accessories via a plurality of accessory ports therein. The method also includes extending a pair of extension arms configured to connect the upper platform and the lower base in a "Z" shape via at least two points on each platform. An embodiment of the method additionally includes resting a traveler's face or a portion thereof in a donut shaped travel pillow on a top surface of the upper platform. The embodiment of the method also includes resting an arm or a hand on an arm rest slid from a lateral side of the upper platform.

Other aspects and advantages of embodiments of the disclosure will become apparent from the following detailed description, taken in conjunction with the accompanying drawings, illustrated by way of example of the principles of the disclosure.

Figure 1:
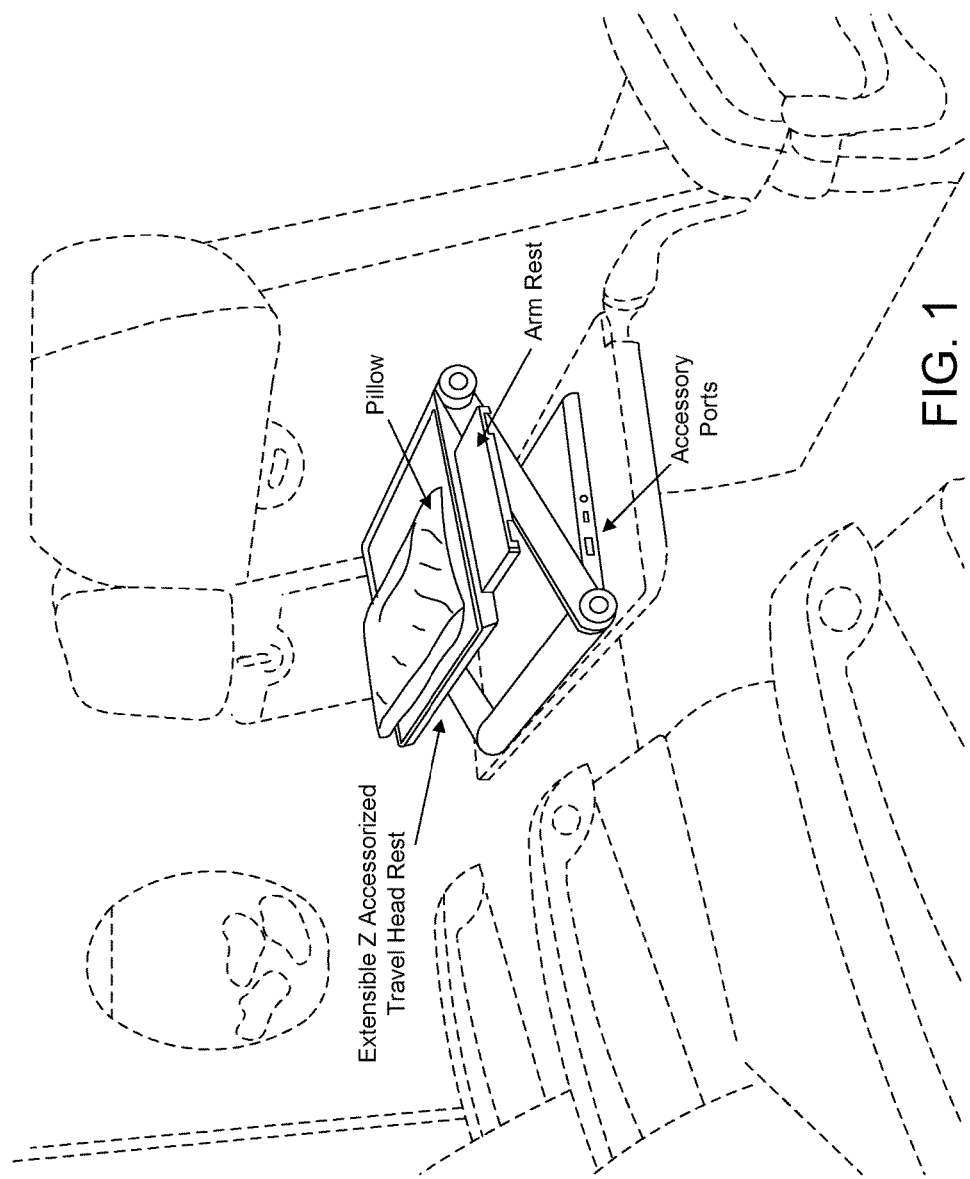
FIG. 1 is a pictorial view of the extensible "Z" accessorized travel head rest and pillow in an airplane setting in accordance with an embodiment of the present disclosure.

Throughout the description, same reference numbers may be used to identify same or similar elements depicted in multiple embodiments. Although specific embodiments of the invention have been described and illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'accessory' may refer to any electronic device which is integrated or able to be integrated with the disclosed device and system. The term 'Z' refers to a nominal form factor of the disclosure which is extensible to a straight line in the extreme where the top and bottom portions of the 'Z' may be folded in or extended straight out. The 'Z' form factor may also be referred to as a scissor configuration and can take any angular and linear configuration around the two hubs or locking pivots as explained in detail below. The 'Z' configuration may also include two 'Z' configurations in a scissor like formation to include two lower hubs and two upper hubs and 2 each left extension arms and 2 each right extension arms for extra stability and strength.

Dimensions detailed herein and in the drawings are intended to be a guide to nominal manufacturing dimensions. The detailed dimensions may vary by plus or minus ten percent taking into account manufacturing restraints and materials for various embodiments as recited, taught and suggested herein. The dimensions therefore are applicable to at least one embodiment but are not meant to be limiting to other embodiments of the disclosure.

The disclosure allows ultimate ergonomic comfort in a portable form factor enabling variable heights and angles to accommodate people big and small. The disclosure incorporates soothing sound, vibration and charging capabilities and can play music wirelessly. The disclosure can also be used as a versatile laptop or tablet surface and is therefore the ultimate travel companion. The disclosure is mounted on plane arm rests and or trays and using airplane pillows, the flat angled surface can be raised from 1" to 14" to fit travelers big and small.

The disclosure is a nominal 12" wide by 8" in length and telescopes up to 14" tall. The flat angled surface is variable through 360 degrees through a universal jointed and ratcheting button activated hub. An integrated battery provides charging for mobile devices via a micro USB port. A full size USB port and Bluetooth connectivity are also provided. On board speakers and a vibrating surface are included in the top platform. The disclosure may comprise robust metal and/or GFL plastic construction with slide-out arm rests. The top platform comprises a non-slip surface and the bottom platform comprises a base rubber padding. A LED on/off, pairing and mode button is also included for the simple button lock angle and height adjustments.

FIG. 1 is a pictorial view of the extensible "Z" accessorized travel head rest and pillow in an airplane setting in accordance with an embodiment of the present disclosure. The disclosure is shown resting on the tray table in front of an airline seat but could just as easily be a bus or a train seat or even in a passenger van, etc. The disclosure is shown with a pillow set thereon for a traveler to rest their head. However, soft rubber and composite padding may also be built into a top side of the upper platform for a passenger to rest their forehead. Arm rests are depicted extending from the lateral sides of the head rest. The arm rests may also include padding for comfort and include mechanisms to capture the passenger's arms so they can rest them in a forward position. Details of the disclosed head rest are explained with respect to FIG. 2 below.

Figure 2:
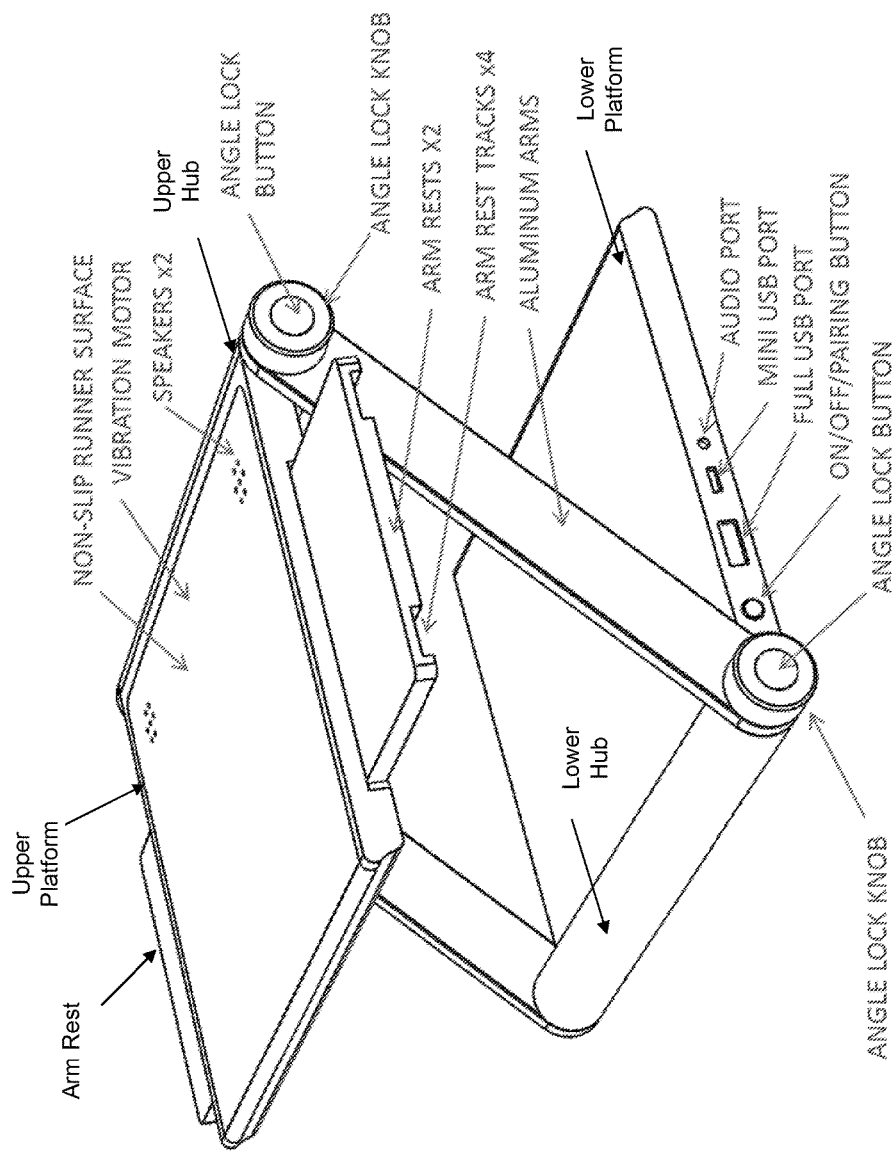
FIG. 2 is a diagrammatic perspective view of the extensible "Z" accessorized travel head rest and referenced accessories in accordance with an embodiment of the present disclosure.

FIG. 2 is a diagrammatic perspective view of the extensible "Z" accessorized travel head rest and referenced accessories in accordance with an embodiment of the present disclosure. A travel aid device and system are disclosed comprising an upper platform adapted to receive a pillow thereon and a plurality of accessories therein. The disclosed device and system also include a lower platform or base adapted to rest on a flat supporting surface and receive a plurality of accessories via a plurality of accessory ports therein. Embodiments of the disclosure include fasteners and mechanisms configured to attach the lower platform or base to a tray table in front of or to the side of the passenger.

The disclosure also includes a pair of extension arms configured to connect the upper platform and the lower base in a "Z" shape via at least two points on each platform. The disclosure may be used with a travel pillow shaped like a donut to receive a traveler's face or a portion of their face therein, the travel pillow received onto a top surface of the upper platform.

An embodiment of the disclosure further includes an arm rest configured to extend from each of two lateral sides of the upper platform. Embodiments also include a ratcheting mechanism on each of the extension arms at a pivot therewith, the ratcheting mechanism configured to allow a 360 degree rotary movement of either platform there around while the a button is depressed or a lock knob is lose and lock rotary movement around a respective lower or upper hub otherwise.

Another embodiment of the disclosure includes an angle lock knob on each of the extension arms at a pivot with each platform, the angle lock knob configured to allow a 360 degree movement of the respective platform around the angle lock knob unless the angle lock knob is rotary tightened. The extension arms are connected at a front right and a front left corner of the lower platform and at a rear right and a rear left corner of the upper platform.

The accessories of the upper platform comprise a vibration motor and an LED (light emitting diode light) screen and audio speakers. The audio speakers may produce soothing sounds such as ocean waves, rain forest fauna, chimes, bird songs, gentle rain and the like and vibrations resulting from such reproduced sounds. The upper platform and the lower platform are collapsible into a single laptop-like shell for compact transport and the travel pillow is detachable therefrom.

Figure 3:
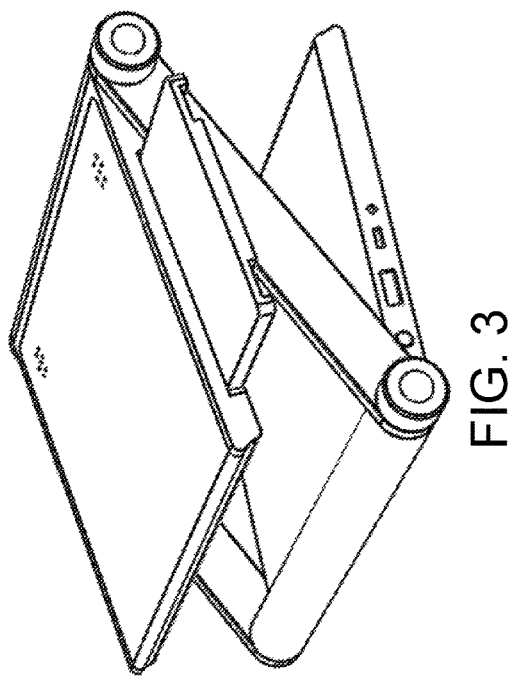
FIG. 3 is a diagrammatic perspective view of the extensible "Z" accessorized travel head rest adjusted to a low (acute) angle in accordance with an embodiment of the present disclosure.

FIG. 3 is a diagrammatic perspective view of the extensible "Z" accessorized travel head rest adjusted to a low (acute) angle in accordance with an embodiment of the present disclosure. The angle between the top platform and the extensible arms is acute and therefore the angle between the bottom platform and the extensible arms is also acute. This allows for an ergonomic reception of a passenger's arms to the arms rests and an ergonomic reception of a passenger's face on a pillow resting on the top platform based on a forward placement of the lower hub. The total height of the top platform does not need to be diminished based on a center of gravity forward or closer to the passenger from the bottom lock hub (not depicted).

Figure 4:
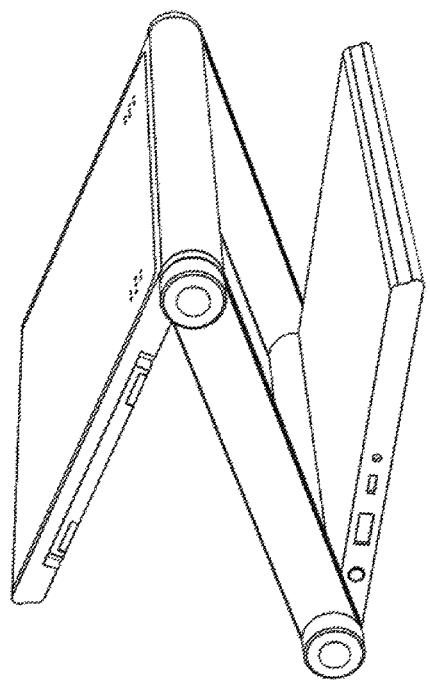
FIG. 4 is a diagrammatic perspective view of the extensible "Z" accessorized travel head rest adjusted to a high (obtuse) angle in accordance with an embodiment of the present disclosure.

FIG. 4 is a diagrammatic perspective view of the extensible "Z" accessorized travel head rest adjusted to a high (obtuse) angle in accordance with an embodiment of the present disclosure. The angle between the top platform and the extensible arms is obtuse and therefore the angle between the bottom platform and the extensible arms is also obtuse. This allows for an ergonomic reception of a passenger's arms to the arms rests and an ergonomic reception of a passenger's face on a pillow resting on the top platform based on a rear placement of the lower hub. The total height of the top platform does not need to be diminished based on a center of gravity forward or closer to the passenger from the bottom lock hub (not depicted).

Figure 5:
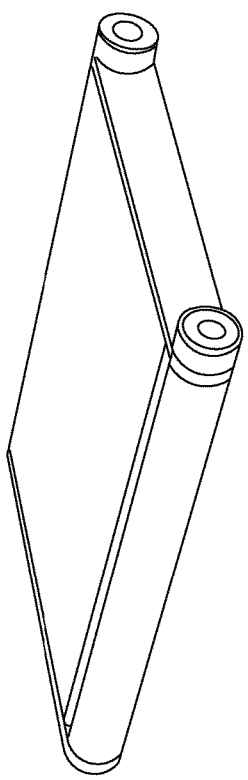
FIG. 5 is a diagrammatic perspective view of the extensible "Z" accessorized travel head rest in a closed position in accordance with an embodiment of the present disclosure.

FIG. 5 is a diagrammatic perspective view of the extensible "Z" accessorized travel head rest in a closed position in accordance with an embodiment of the present disclosure. The head rest closed position resembles a laptop shell in a closed position and enables a compact carry and storage of the extensible Z accessorized head rest. An LED screen is still viewable on the top surface of the top platform though the accessory ports may be occluded. Alternative designs comprise the accessory ports located on one of the bottom hub, the top hub, the top platform, the bottom platform and the extensible arms.

Figure 6:
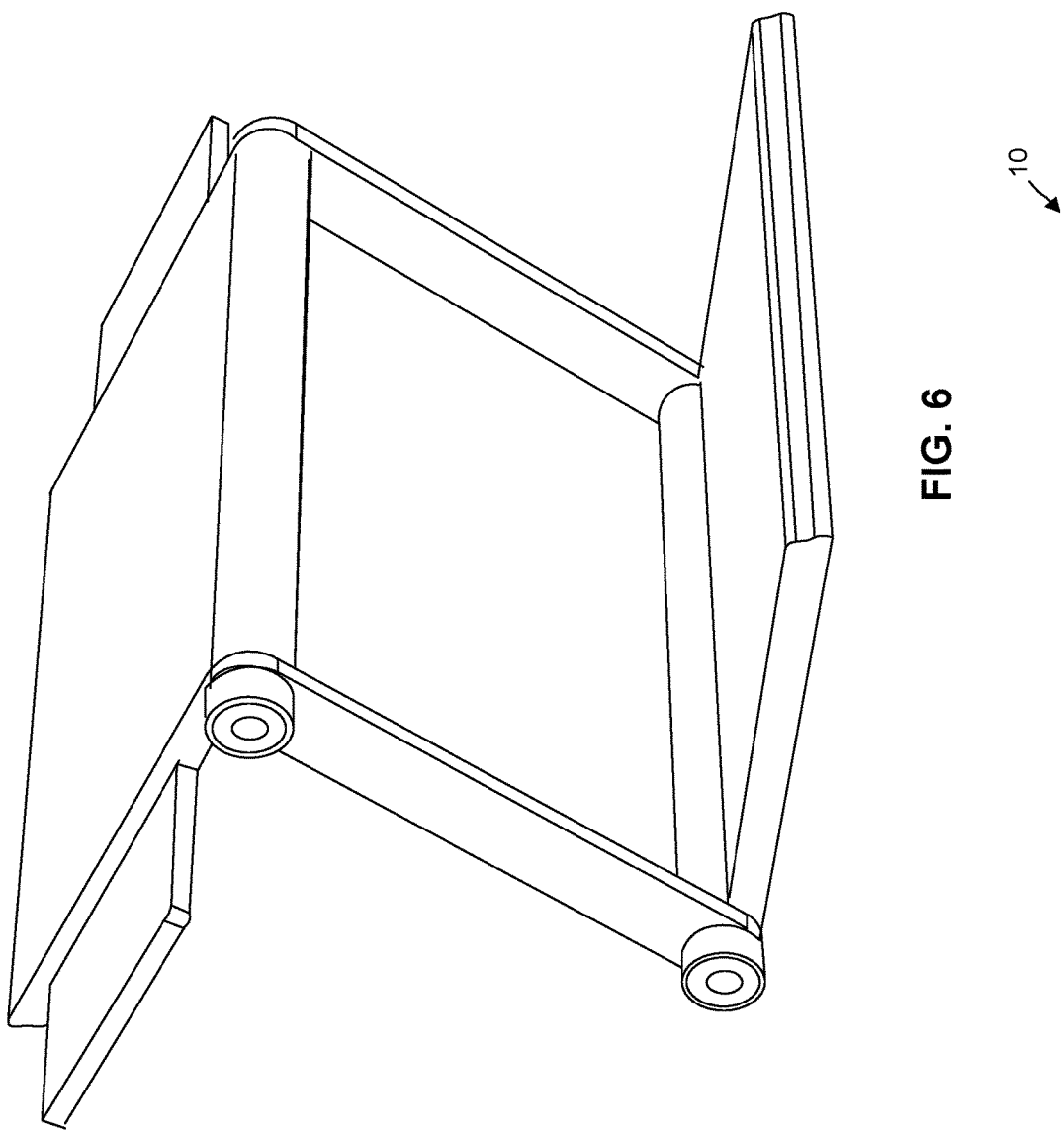
FIG. 6 is a diagrammatic perspective view of the extensible "Z" accessorized travel head rest adjusted to a double high (obtuse) angle in accordance with an embodiment of the present disclosure.

FIG. 6 is a diagrammatic perspective view of the extensible "Z" accessorized travel head rest adjusted to a double high (obtuse) angle in accordance with an embodiment of the present disclosure. The depicted configuration and placement of the head rest is similar to the configuration of FIG. 4, but the upper platform is extended even higher to accommodate taller passengers. The upper platform and the lower platforms are locked into position by the ratcheting and locking lower and upper hubs. The arm rests may also be locked into position by a pinion mechanism disposed between the arms rests and the upper platform.

Figure 7:
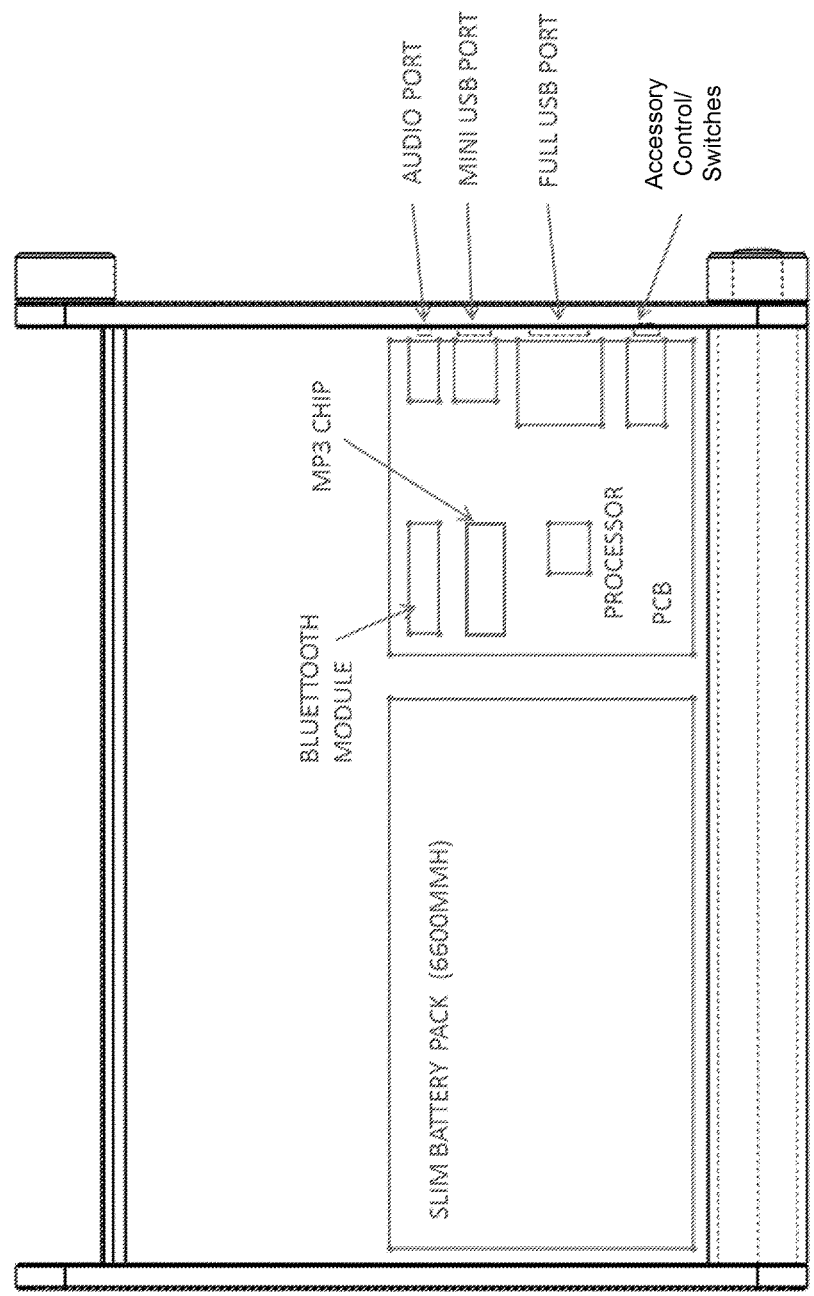
FIG. 7 is a block diagram view of the extensible "Z" accessorized travel head rest lower platform and contents thereof in accordance with an embodiment of the present disclosure.

FIG. 7 is a block diagram view of the extensible "Z" accessorized travel head rest lower platform and contents thereof in accordance with an embodiment of the present disclosure. In an embodiment of the disclosure, the contents include a battery power pack, an electronic processor, a PCB (printed circuit board), a MP3 communications chip, an audio port, a mini USB (Universal Serial Bus) port and a full USB port. A button switch for on/off and pairing LED lit to indicate a mode of operation and allows passenger control of the disclosed accessories.

Figure 8:
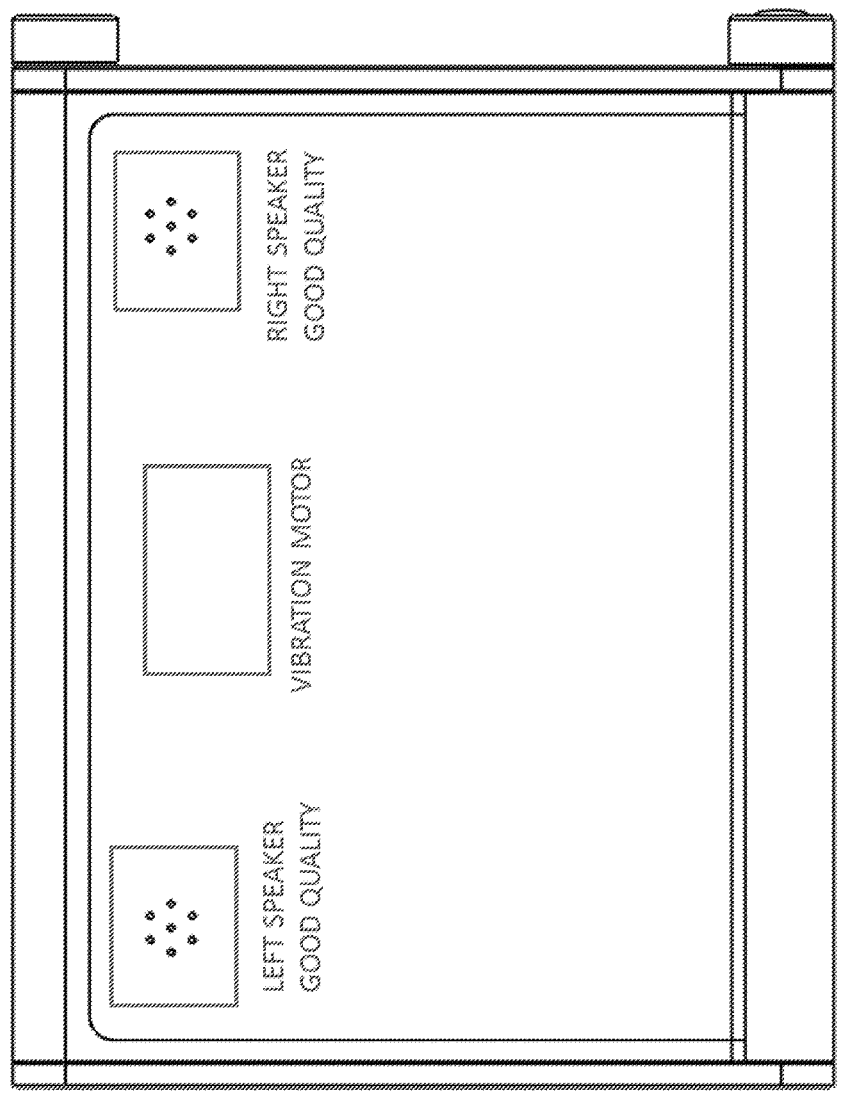
FIG. 8 is a block diagram view of the extensible "Z" accessorized travel head rest upper platform and contents in accordance with an embodiment of the present disclosure.

FIG. 8 is a block diagram view of the extensible "Z" accessorized travel head rest upper platform and contents in accordance with an embodiment of the present disclosure. An embodiment of the top platform includes audio speakers for the passenger's enjoyment and also for noise cancelation. A vibration motor is provided to soothe the passenger and is therefore set to ergonomic frequencies.

Figure 9:
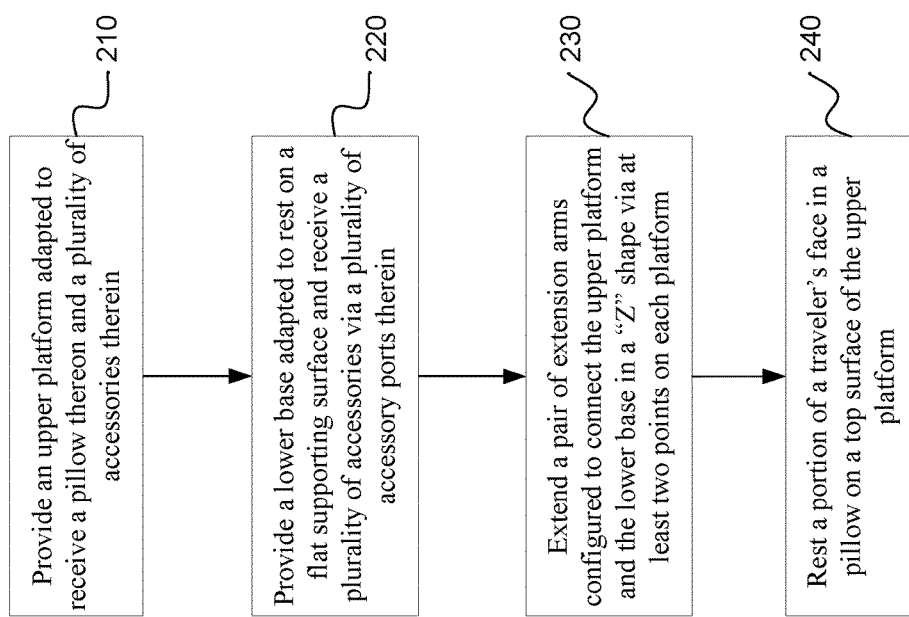
FIG. 9 is a flow chart of a method of rest for a traveler including the extensible "Z" accessorized travel head rest in accordance with an embodiment of the present disclosure.

FIG. 9 is a flow chart of a method of rest for a traveler including the extensible "Z" accessorized travel head rest in accordance with an embodiment of the present disclosure. A disclosed traveler resting method includes providing 210 an upper platform adapted to receive a pillow thereon and a plurality of accessories therein, and providing 220 a lower base adapted to rest on a flat supporting surface and receive a plurality of accessories via a plurality of accessory ports therein. The method also includes extending 230 a pair of extension arms configured to connect the upper platform and the lower base in a "Z" shape via at least two points on each platform. An embodiment of the method additionally includes resting 240 a traveler's face or a portion thereof in a donut shaped travel pillow on a top surface of the upper platform. The embodiment of the method also includes resting an arm or a hand on an arm rest slid from a lateral side of the upper platform.

The present disclosure therefore meets the long felt need in the market for a travel aid extending from a forward mounted tray table or from a desk. The present disclosure also provides accessory ports for audio visual functions and control thereof local and private to the passenger and not provided by an airline such as a vibrating head rest.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the disclosure be limited, except as by the specification and claims set forth herein.

What is claimed is:

1. A travel aid device, comprising:
    an upper platform configured to receive a pillow thereon and a plurality of accessories therein, the upper platform having two lateral edges and a rear corner on each lateral edge;
    a lower platform configured to sit on a flat supporting surface and receive a plurality of accessories via a plurality of accessory ports therein, the lower platform having two lateral edges and a front corner on each lateral edge;
    at least two extension arms connecting the upper platform and the lower platform via the respective two rear corners and the two front corners in a first "Z" shape configuration wherein the at least two extension arms slide past the lateral edges on each platform in a scissor configuration and the upper platform is spaced from the lower platform, and in a second collapsed configuration in which the upper platform and the lower platform are adjacent each other and collapsed into a stacked pair for compact transport wherein the upper platform, lower platform, and extension arms are parallel with each other; and
    wherein the upper platform, the lower platform, and the at least two extension arms each define a height, the height of each extension arm being substantially equal to combined heights of the upper platform and the lower platform such that in the collapsed configuration an uppermost surface of each extension arm is flush with an uppermost surface of the upper platform and such that in the collapsed configuration a bottom surface of each extension arm is flush with a bottom surface of the lower platform.

2. The travel aid device of claim 1, further comprising a planar arm rest configured to slidably extend from an interior of a lateral side of the upper platform.

3. The travel aid device of claim 1, further comprising an angle lock button on at least one of the extension arms at a pivot there with, the angle lock button configured to allow a 360 degree rotary movement of either platform there around while the button is depressed and lock rotary movement otherwise.

4. The travel aid device of claim 1, further comprising a non-slip surface on a top side of the upper platform and a non-slip surface on a bottom side of the lower platform.

5. The travel aid device of claim 1, wherein the accessories of the upper platform comprise a vibration motor and at least one audio speaker.

6. The travel aid device of claim 1, wherein the accessories and accessory ports of the lower platform comprise a battery and an on/off/pairing button, a full USB (universal serial bus) port and a mini USB port and an audio port.

7. The travel aid device of claim 1, further comprising a power and communications bus between the upper platform and the lower platform, the bus configured in or adjacent to one of the extension arms.

8. A traveler resting method, comprising:
    providing an upper platform configured to receive a pillow thereon and a plurality of accessories therein, the upper platform having two lateral edges and a rear corner on each lateral edge;
    providing a lower platform configured to sit on a flat supporting surface and receive a plurality of accessories via a plurality of accessory ports therein, the lower platform having two lateral edges and a front corner on each lateral edge;
    providing at least two extension arms connecting the upper platform and the lower platform via the respective two rear corners and the two front corners in a first "Z" shape configuration wherein the at least two extension arms slide past the lateral edges on each platform in a scissor configuration and the upper platform is spaced from the lower platform, and in a second collapsed configuration in which the upper platform and the lower platform are adjacent each other and collapsed into a stacked pair for compact transport wherein the upper platform, lower platform, and extension arms are parallel with each other;

wherein the upper platform, the lower platform, and the at least two extension arms each define a height, the height of each extension arm being substantially equal to combined heights of the upper platform and the lower platform such that in the collapsed configuration an uppermost surface of each extension arm is flush with an uppermost surface of the upper platform and such that in the collapsed configuration a bottom surface of each extension arm is flush with a bottom surface of the lower platform;

extending the extension arms into the first "Z" shape configuration; and receiving onto a top surface of the upper platform a travel pillow shaped to receive a portion of a traveler's face therein.

9. The method of resting a traveler of claim 8, further comprising resting the traveler's face on the travel pillow on the top surface of the extended upper platform.

10. The method of resting a traveler of claim 8, further comprising resting an arm or a hand on an arm rest slid from a lateral side of the upper platform.

* * * * *